Nov. 8, 1966    C. P. HOSTETLER    3,283,472
BULK BIN FILLER
Filed June 18, 1963    4 Sheets-Sheet 1
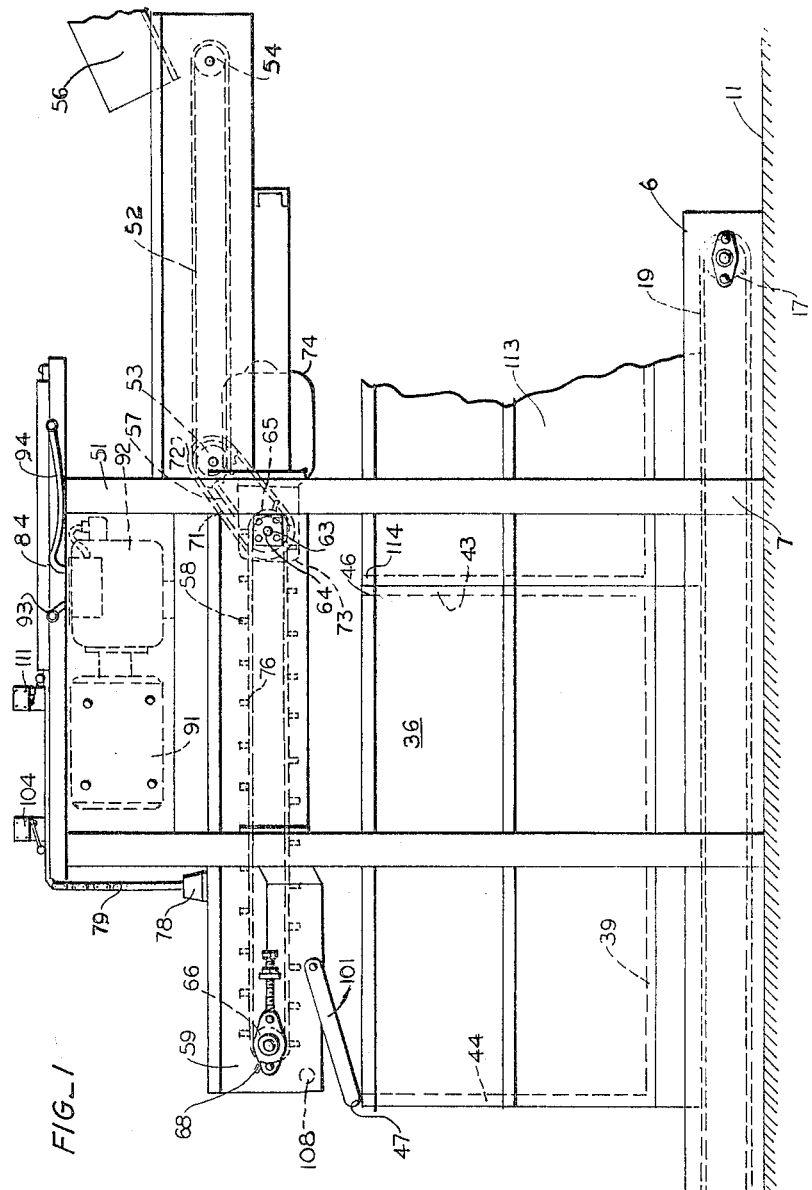
FIG_1
INVENTOR.
CHARLES P. HOSTETLER
BY Lothrop & West
ATTORNEYS

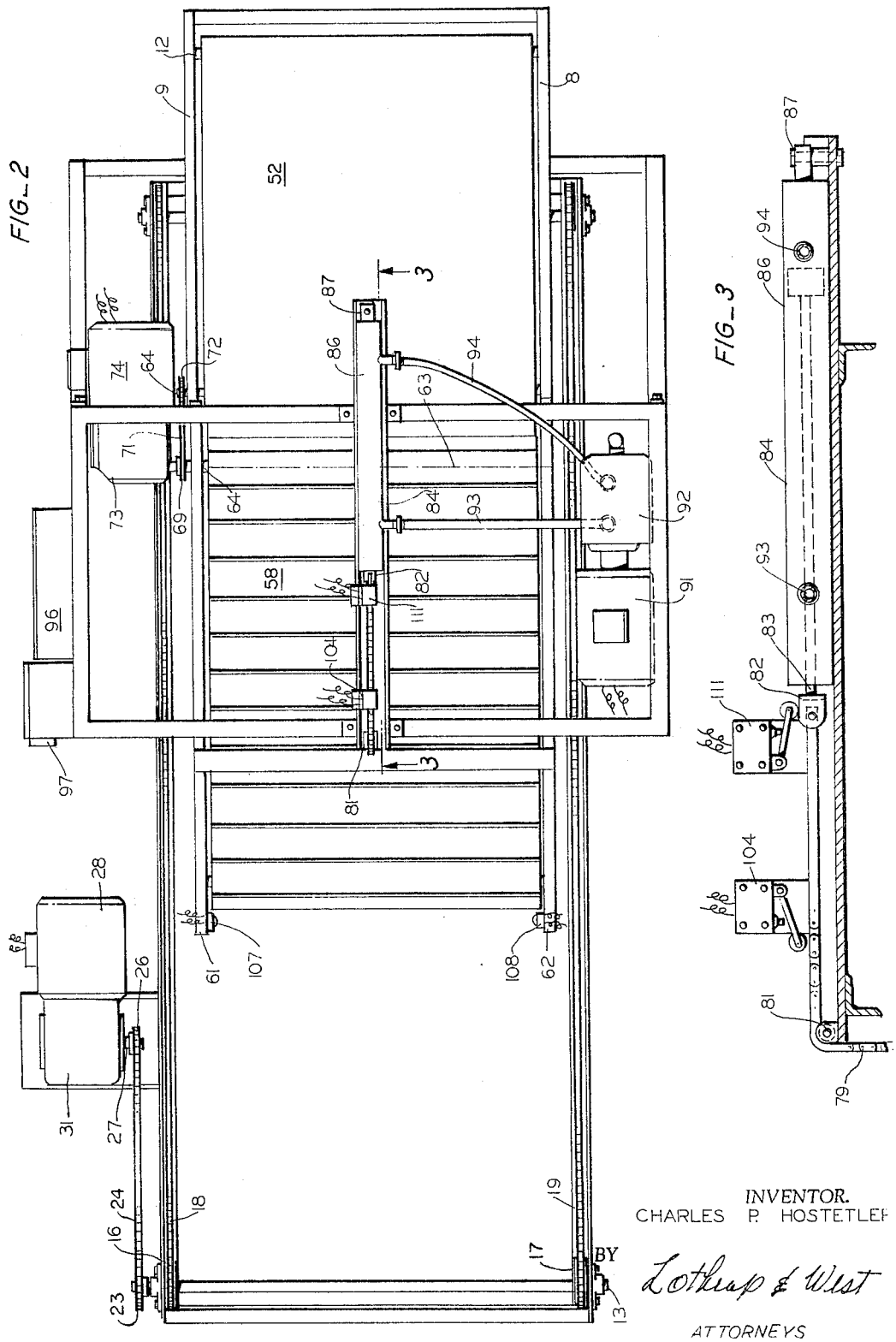

Nov. 8, 1966　　　　C. P. HOSTETLER　　　3,283,472
BULK BIN FILLER
Filed June 18, 1963　　　　　　　　　　4 Sheets-Sheet 3
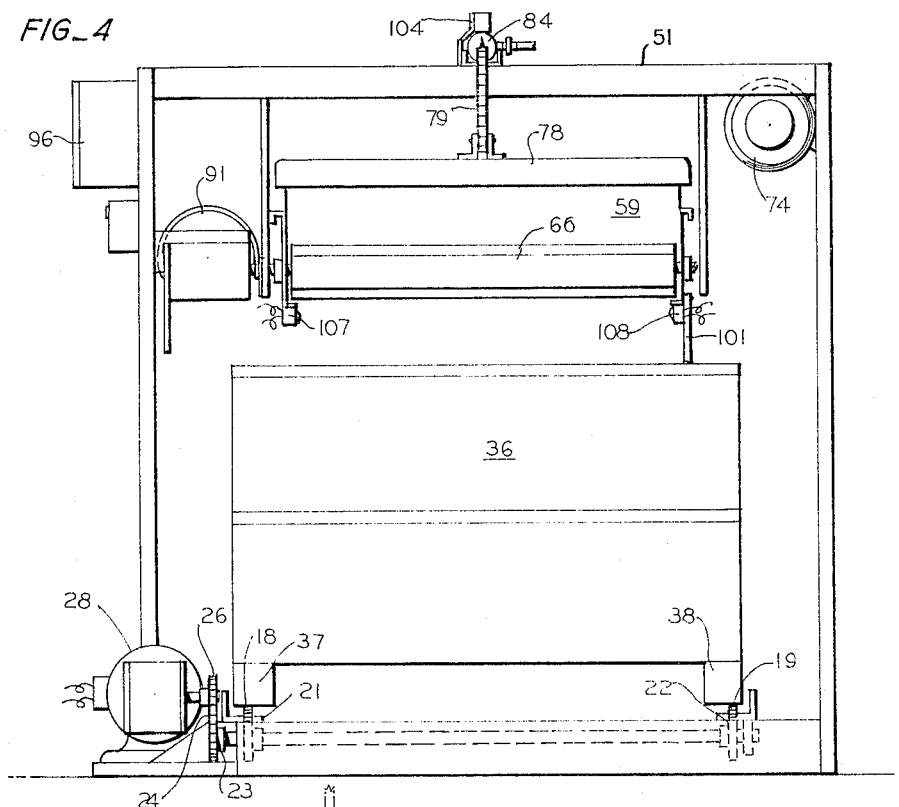
INVENTOR.
CHARLES P. HOSTETLER
BY
Lothrop & West
ATTORNEYS

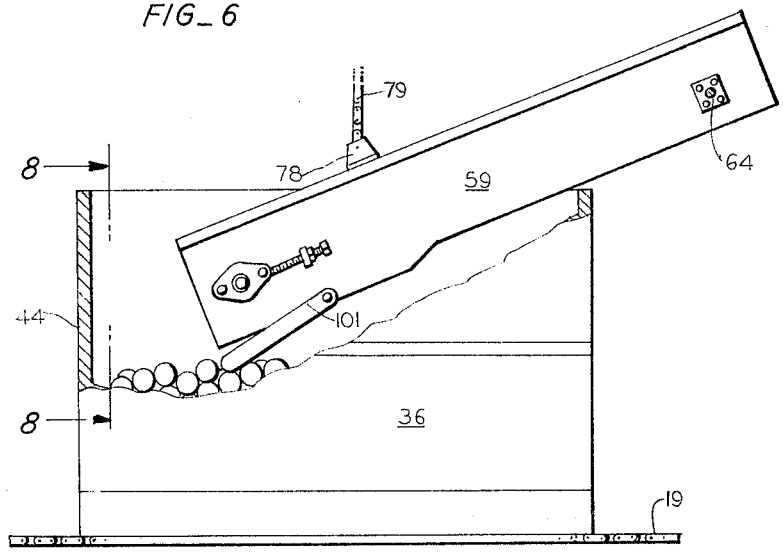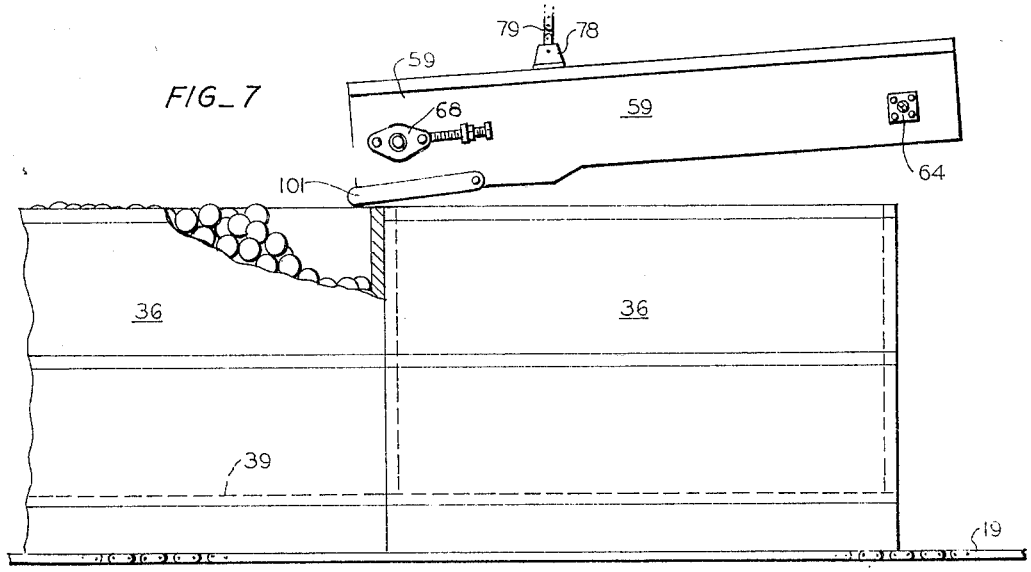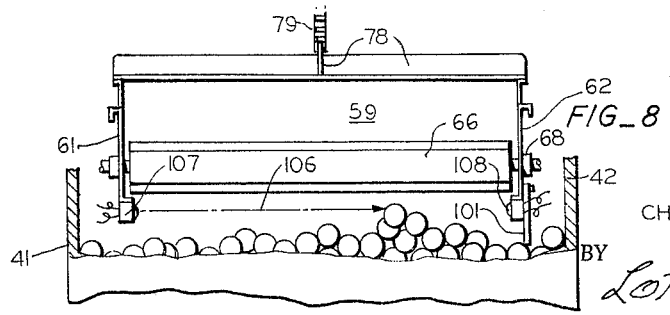

United States Patent Office 3,283,472
Patented Nov. 8, 1966

3,283,472
BULK BIN FILLER
Charles P. Hostetler, Redlands, Calif., assignor to The Regents of The University of California, Berkeley, Calif.
Filed June 18, 1963, Ser. No. 288,704
12 Claims. (Cl. 53—64)

My invention relates to machinery especially useful in handling commodities such as fruit, vegetables, fish, and the like, requiring protection against injury by impact. A related device is shown in the copending application of Michael O'Brien entitled "Bulk Bin Filler" filed Feb. 6, 1961, Ser. No. 87,463, now Patent 3,097,460.

In the modern handling of many commodities, machinery is designed to take care of a large bulk of material in a short time and the aim is always to prevent injury or bruising of the commodity by the provision of means for handling the commodity gently. This is particularly true in connection with a recent trend in the handling of fruit, for example, in which the fruit is gathered in relatively large boxes referred to as "bulk bins" and is processed by the use of such containers.

It is therefore an object of this invention to provide a bulk bin filler which is effective to handle the commodity gently and without injury.

Another object of the invention is to provide a bulk bin filler which is completely automatic in its operation and does not require any operator supervision.

Another object of the invention is to provide a bulk bin filler which operates by power means to handle relatively heavy loads of material.

Another object of the invention is to provide a bulk bin filler adapted for automatic use with bulk bins of the sort currently in operation.

Another object of the invention is in general to improve bulk bin fillers.

Other objects together with the foregoing are attained in the embodiment of the invention described in the accompanying description and illustrated in the accompanying drawings, in which:

FIGURE 1 is a side elevation of a bulk bin filler pursuant to the invention with a bin in position;

FIGURE 2 is a plan of the structure shown in FIGURE 1;

FIGURE 3 is a detail in cross section, the plane of which is indicated by the line 3—3 of FIGURE 2;

FIGURE 4 is a front elevation of the bulk bin filler of the invention;

FIGURE 5 is a diagram showing the mechanism in one position of operation in cross section on a vertical longitudinal plane, many parts of the mechanism being removed for clarity;

FIGURE 6 is a cross section similar to FIGURE 5, but with the mechanism in an advanced position of operation;

FIGURE 7 is a cross section similar to FIGURES 5 and 6, but showing the mechanism in a still further advanced position of operation; and FIGURE 8 is a cross section, the plane of which is taken on the line 8—8 of FIGURE 6.

While the bulk bin filler of the invention can be embodied in a number of different forms and can be especially adapted for use with numerous different commodities, it has been particularly successful in the form shown herein designed for operation with fruit; for example, pears. In this arrangement there is provided a bin conveyor 6. This conveniently is supported on the general frame 7 of the machine. Included in the frame is a pair of side rails 8 and 9 suitably spaced apart and disposed in parallel horizontal location on the floor 11. Arranged on the frame 7 is a trailing shaft 12 and a driving shaft 13 carrying pairs of sprockets 16 and 17 around which conveyor chains 18 and 19 are trained. These chains on their upper runs rest upon appropriate angles 21 and 22 (FIGURE 4) so that the chains 18 and 19 are firmly supported for substantially their entire length.

To drive the bin conveyor chains, the shaft 13 is extended to carry a sprocket 23 connected by a drive chain 24 to a sprocket wheel 26. This is carried on the end of a drive shaft 27 connected to an electric drive motor 28. When the motor 28 is energized, the chains 18 and 19 are propelled in a direction to advance their upper runs from right to left in FIGURE 1. The motor 28 is connected to the drive shaft 27 through a reduction gearing 31 involving a non-overhauling worm or a high gear ratio so that while the chains 18 and 19 exactly follow the operation of the motor 28 the chains cannot themselves even under the impetus of a heavy load transmit driving motion back to the motor 28. In this fashion, the motor 28 can be precisely controlled correspondingly to start and stop the drive chains 18 and 19 under all load conditions thereof.

Adapted to be supported on, advanced by and stopped by the chains 18 and 19 of the bin conveyor 6 is a bulk bin 36. Bulk bins vary from time to time and location to location, but are generally possessed of certain standard characteristics. A typical bin 36, for example, has a pair of support beams 37 and 38 (FIGURE 4) on which the bin bottom 39 rests. Surrounding the bottom are side walls 41 and 42 as well as a rear wall 43 and a forward or leading wall 44. The walls 43 and 44, at least, are of a common height and terminate in coplanar upper edges 46 and 47. In the usual installation, the conveyor frame 7 is in alignment with other packing house conveying machinery, so that bins 36 are supplied in sequence but under only a small driving impetus. Once a bin 36 has been received by and rests upon the bin conveyor chains 18 and 19, the motion of that individual bin is then controlled by the operation of the bin conveyor.

Included in the frame 7 is a superstructure 51 spanning the bin conveyor and serving at least as part of the support for a feeding conveyor 52. This includes a suitable draper or belt trained around driving drums 53 and 54 and is so arranged as to receive the fruit to be handled from a supplying mechanism 56 which froms no part of the present structure but is a portion of the customary packing house machinery.

The feeding conveyor 52 operates with its upper run advancing toward the left in FIGURE 1 and discharges over a guide plate 57 onto a fruit conveyor 58. This conveyor includes a cleated draper or belt mounted on a fruit conveyor framework 59. A pair of side plates 61 and 62 are joined together to form a rigid structure and at one end are connected to swing about the axis 63 of a cross shaft 64 appropriately mounted on the main frame 7. The cross shaft 64 carries a roller 65 for driving the fruit conveyor belt 58. At the other end the fruit conveyor belt 58 is trained around a roller 66 suitably mounted in adjusting mechanisms 68 on the side plates 61 and 62 so that the tension of the belt can be suitably arranged.

The shaft 64 carrying the roller 65 is extended and is provided with a sprocket 69 joined by a chain 71 to a drive sprocket 72 for the feeding conveyor 52. The shaft 64 is continued into a speed reducer 73 connected to an electric motor 74 suitably supported on the frame 7. The nature of the speed reducer 73 is such that the positions of the electric motor 74 and of the belts 52 and 58 always correspond. There is no reverse drive from the belts back to the motor. In the operation of this portion of the structure, fruit discharged onto the moving conveyor 52 advances to the left in FIGURE 1 and is transferred gently across the guide plate 57 onto the fruit conveyor belt 58. The cleats 76 on the belt 58 are large enough so that material on the belt partakes of the speed of the fruit conveyor belt and does not roll or travel relative thereto despite a steep inclination.

Pursuant to the invention, special means are provided for operating the fruit conveyor framework 59 in a pivotal or swinging motion in a vertical plane and about the axis 63. For that reason, the fruit conveyor framework 59 is provided with a yoke 78 to which one end of an operating chain 79 is fastened. This chain 79 is trained around a guide pulley 81 on the superstructure 51. At its other end the chain 79 is connected to a block 82 on a piston rod 83 projecting from a cylinder 84 included in a hydraulic jack mechanism 86. The hydraulic jack is considered as a motor and is appropriately fastened by a connection 87 to the superstructure 51. The jack 86 is adapted to reciprocate and by its rectilinear motion to move the framework 59 in its swinging path into and out of a bin 36 on the bin conveyor.

In order that the jack or hydraulic motor 86 can be appropriately operated, a suitable driving mechanism is provided on the superstructure 51. An electric motor 91 is connected to a hydraulic unit 92 including not only a hydraulic reservoir, but also a pump and relief valve for circulating the hydraulic fluid from the reservoir to the hydraulic jack 86 under appropriate control. The control includes a hydraulic valve mechanism (not shown) controlled by a solenoid device so that hydraulic fluid under pressure can be transmitted and returned through a pair of flexible hydraulic hoses 93 and 94. Under electrical control, therefore, the jack 86 is supplied with fluid under pressure and returns discharged fluid to the reservoir so that the piston rod 83 is advanced or retracted in any controlled amount and at any time desired.

The various electric motors 28, 74 and 91 are connected by electrical means into a suitable control box 96 on the superstructure 51 and are further controlled by electrical switching means on the framework effective to operate the various motors at appropriate times. There is also a manual off-on switch 97 of the customary kind useful in starting and stopping the mechanism at the beginning and end of a protracted run.

In the operation of this device, starting with the fruit conveyor framework 59 in its uppermost position as shown in FIGURE 1, and with a limit switch 111 actuated by the block 82 also effective to close the circuit to the motor 28, when the manual switch 97 is moved to its "on" position, the stationary motor 28 is energized and advances the upper run of the bulk bin conveyor 6 to bring a bin 36 from the right in FIGURE 1 in a horizontal path toward the left and substantially into the position occupied by the complete bin in FIGURE 1.

To assist in the control of the advancing bin, there is provided a switch arm 101 on the framework 59 and normally spring pressed downwardly into the path of the leading edge 47 of the bin 36. When the arm 101 is in its downward position, it cooperates in closing the circuit to energize the motor 28. When the bin 36 advances far enough so that the leading edge 47 cams against and lifts the lever 101, then the lifting lever opens a switch to de-energize the bin conveyor motor 28 and the bin 36, therefore, comes to a prompt stop in a selected location.

In addition, another switch actuated by the lifted lever 101 has a further function of energizing the solenoids controlling the valve in the hydraulic unit 92. The motor 91 operates after it is energized by the "on" switch 97. Thus, when the lever 101 is lifted to energize the solenoid switch, the valve is shifted into a position so that fluid is supplied under pressure to the right end of the jack 86 and fluid is discharged from the left end thereof. The piston rod 83 is expelled from the jack and the chain 79 is paid out to lower the fruit conveyor framework 59 from its uppermost, substantially horizontal position into a downwardly inclined position within the bin 36. As the block 82 leaves the limit solenoid control switch 111, the switch actuated by the lever 101 is deenergized.

In order to provide an appropriate ultimate stop for the lowering movement of the fruit conveyor framework 59, a limit switch 104 is mounted in an adjustable location on the superstructure 51. The switch 104 is in the circuit controlling the solenoids for the hydraulic valve in the hydraulic power unit 92. Thus, when the piston rod 83 has projected to such a point that the framework 59 is approximately in the position shown in FIGURE 5; that is, its maximum desired lower position, then the limit switch 104 is actuated by the block 82 and there is no further lowering movement of the frame 59.

Not only does the limit switch 104 stop the lowering movement of the fruit conveyor frame 59, but it also serves to energize the motor 74 to start the conveyor belts 52 and 58 into operation. Fruit is thus delivered by the conveyor 52 and is lowered against the cleats 76 on the fruit conveyor 58 to begin to fill the bin, as shown in FIGURE 5. The filling operation continues until such time as the fruit piles up to a level to interrupt a light beam 106 (FIGURE 8) extending normally between a source 107 and a receiver 108. The light beam mechanism constitutes in effect an electrical switch for controlling the operation of the solenoid valves in the hydraulic unit 92. As long as the beam 106 is continuous and is received at the receiver 108, the solenoid valve is undisturbed by this control, but as soon as the piled up fruit interrupts the light beam 106, then the valve is operated to put pressure fluid ahead of the piston in the jack 86 and thus to raise the frame 59. The interruption of the light beam also causes simultaneous energization of the motor 28. Thus the conveyor chains 18 and 19 are advanced while the frame 59 is being lifted. This establishes a new fruit conveyor framework and bulk bin position. As soon as the movement has been sufficient to permit the reestablishment of the light beam 106, then both the motor 28 and the solenoid valve are de-energized in order to leave and hold the parts in the new location. During this time, the conveyor 58 continues to operate and to discharge fruit. The operation of simultaneously advancing the conveyor chains 18 and 19 and energizing the jack 86 to lift the fruit conveyor frame continues off and on under control of the light beam until such time as the bin 36 is substantially filled and has been moved forwardly a large amount.

As soon as the bin has been substantially filled with fruit and the frame 59 is near its uppermost position, the block 82 on the piston rod 83 comes into position to actuate the limit switch 111. This stops further lifting moveemnt of the jack 86 and de-energizes the motor 74 to prevent further discharge of fruit. With the fruit conveyor frame 59 in its uppermost position, and with the conveyors 52 and 58 stopped, the motor 28 is energized by actuation of the limit switch 111 and advances the bulk bin 36 and also a succeeding bulk bin 113 which has theretofore been started onto the conveyor chains 18 and 19. This advancing movement of the bulk bins 36 and 113 occurs since the trailing edge 46 of the bin 36 has not yet come into abutment with the depending lever 101. Thus the motor 28 runs and the bulk bin conveyors advance until such time as the switch lever 101 rides over the trailing edge 46 of the bulk bin 36, and also rides over the leading edge 114 of the succeeding bulk bin 113. The trailing edge 46 lifts the lever 101 into such a position as to de-energize the advancing motor 28. When the bin 113 has assumed the former initial position of the bulk bin 36, the lever 101 drops down from the leading edge thereof and shuts off the motor 28 while energizing the solenoids for the hydraulic valve. The fruit conveyor frame 59 again begins its lowering movement and the previous cycle repeats. As long as there are bins such as 36 and 113 supplied to the device, the cycle repeats itself once with each bin. It can, of course, be stopped at any time by the manual operation of the switch 97.

In this fashion there has been provided a bulk bin conveyor which not only handles the fruit gently and in accordance with plan, but also operates without utilizing any of the advancing force of the bulk bins themselves on their conveyor. Rather, the fruit conveyor frame is operated by its own power, yet under the control of the bins themselves.

What is claimed is:

1. A bulk bin filler for use with a bin having a trailing edge comprising a frame, a bin conveyor on said frame for advancing a bin thereon, first means on said frame for driving said bin conveyor, a fruit conveyor framework, means for pivotally mounting said fruit conveyor framework on said frame to swing into and out of a bin on said bin conveyor, second means on said frame for driving said fruit conveyor framework, means on said fruit conveyor framework and engageable with said trailing edge for controlling said first driving means and for controlling said second driving means, and means on said fruit conveyor framework actuated by fruit in said bin for also controlling said first driving means and said second driving means.

2. A bulk bin filler for use with a bin having a trailing edge comprising a frame, a bin conveyor on said frame for advancing a bin thereon, first means on said frame for driving said bin conveyor, a fruit conveyor framework, means for mounting said fruit conveyor framework on said frame for movement into and out of a bin on said bin conveyor, second means on said frame for driving said fruit conveyor framework, and means on said fruit conveyor framework and engageable with said trailing edge for controlling said first driving means and said second driving means.

3. A bulk bin filler for use with a bin having a transverse edge comprising a frame, a bin conveyor on said frame for advancing a bin longitudinally thereon, first means on said frame for driving said bin conveyor, a fruit conveyor framework, means for mounting said fruit conveyor framework on said frame for movement into and out of a bin on said bin conveyor, second means on said frame for driving said fruit conveyor framework, and means responsive to an advancing bin on said frame for simultaneously controlling said first driving means and said second driving means.

4. A bulk bin filler as in claim 3 in which said responsive means includes a lever engageable with said transverse edge.

5. A bulk bin filler as in claim 3 in which there is a means responsive to fruit in said bin for simultaneously operating said first driving means and said second driving means.

6. A bulk bin filler for use with a bin comprising a frame, a bin conveyor on said frame for advancing a bin thereon, first means on said frame for driving said bin conveyor, a fruit conveyor framework, means for mounting said fruit conveyor framework for movement into and out of a bin on said bin conveyor, second means on said frame for driving said fruit conveyor framework, and means responsive to the position of fruit in said bin for operating said first driving means and said second driving means concurrently.

7. A bulk bin filler for use with a bin comprising frame, a chain conveyor on said frame for advancing a bin thereon, a first motor for driving said chain conveyor, a fruit conveyor framework, means for mounting said fruit conveyor framework on said frame for swinging movement into and out of a bin on said frame second motor for swinging said fruit conveyor framework, a switch on said fruit conveyor framework and engageable with said bin for controlling said first motor and said second motor, means on said fruit conveyor framework and responsive to the position of fruit in said bin for controlling said first motor and said second motor and means responsive to the position of said fruit conveyor framework for controlling said first motor and said second motor.

8. A bulk bin filler as in claim 7 in which said second motor is a hydraulic jack movable between two extreme positions and in which said means responsive to the position of said fruit conveyor framework includes a pair limit switches actuated by said hydraulic jack.

9. A bulk bin filler for use with a bin comprising frame having horizontal side members, a chain conveyor having chains on said side members for advancing a bin thereon, a first motor for driving said chain conveyor, a fruit conveyor framework, means for pivotally mounting said fruit conveyor framework on said frame about a bin on said chain conveyor for swinging movement of one end of said fruit conveyor frame into and out of said bin, a second motor on said frame and movable between two extreme positions, means for connecting said second motor to said fruit conveyor framework for moving said fruit conveyor framework into and out of said bin as said second motor moves between said two extreme positions, means responsive to the position of fruit in said bin and responsive to the two extreme positions of said second motor for controlling the operation of said first motor fruit conveyor on said fruit conveyor framework, a third motor for operating said fruit conveyor, and means responsive to the two extreme positions of said second motor for controlling said third motor.

10. A bulk bin filler as in claim 9 in which said means responsive to position of fruit in said bin also controls said second motor.

11. A bulk bin filler as in claim 9 in which said means responsive to the position of fruit in said bin includes electric eye.

12. A bulk bin filler as in claim 9 in which the means responsive to the two extreme positions of said second motor include limit switches on said frame.

References Cited by the Examiner

UNITED STATES PATENTS 3,097,460 7/1963 O'Brien _____ 53—
3,147,846 9/1964 Huntoon.

FOREIGN PATENTS 459,899 1/1937 Great Britain.

TRAVIS S. McGEHEE, *Primary Examiner.*